United States Patent [19]

Ueno

[11] Patent Number: 4,834,690
[45] Date of Patent: May 30, 1989

[54] FLEXIBLE COUPLING WITH BENT PLATE BODY

[75] Inventor: Yasuo Ueno, Kawasaki, Japan

[73] Assignee: Kokusai Gijutsu Kaihatsu Kabushiki Kaisha, Tokyo, Japan

[21] Appl. No.: 133,213

[22] Filed: Dec. 10, 1987

Related U.S. Application Data

[63] Continuation of Ser. No. 6,181, Jan. 23, 1987, abandoned.

[30] Foreign Application Priority Data

| Jan. 23, 1986 | [JP] | Japan | 61-8170 |
| Nov. 4, 1986 | [JP] | Japan | 61-169392 |
| Nov. 4, 1986 | [JP] | Japan | 61-169393 |
| Nov. 10, 1986 | [JP] | Japan | 61-172168 |
| Nov. 17, 1986 | [JP] | Japan | 61-177370 |

[51] Int. Cl.$^4$ ................................................ F16D 3/50
[52] U.S. Cl. .............................. 464/84; 464/101; 464/147
[58] Field of Search ............ 464/81, 84, 100, 101, 464/102, 106, 147

[56] References Cited

U.S. PATENT DOCUMENTS

| 3,200,659 | 8/1965 | Angelini | 464/84 X |
| 3,272,492 | 9/1966 | Jones | 464/84 X |
| 3,499,299 | 3/1970 | Hector | 464/81 |
| 3,548,613 | 12/1970 | Mounteer | 464/81 |
| 3,934,487 | 1/1976 | Becker | 464/84 X |
| 4,382,709 | 5/1983 | Brown | 464/147 X |
| 4,516,958 | 5/1985 | Phillips | 464/100 X |

FOREIGN PATENT DOCUMENTS

| 2910376 | 10/1980 | Fed. Rep. of Germany | 464/84 |
| 853804 | 3/1940 | France | 464/101 |
| 262555 | 1/1970 | U.S.S.R. | 464/81 |
| 861600 | 2/1961 | United Kingdom | 464/101 |

Primary Examiner—Daniel P. Stodola
Attorney, Agent, or Firm—Pollock, Vande Sande & Priddy

[57] ABSTRACT

A flexible coupling for coupling a drive member with a driven member has a supporting plate to which a first pair of flexible plates and a second pair of flexible plates are fixed in such a way that the former extends in parallel in one direction and the latter extends in parallel in a direction opposite the one direction. To free end portions of the flexible plates, a first and second joint members for connecting the drive and driven members to the flexible coupling, respectively, are connected. When there is a dis-alignment between the axes of the drive and driven members, a bending force is applied to the flexible plates to flex the same, thus absorbing the axial offset therebetween. In this case, since the rotational force to be transmitted is applied in the width direction of the respective plate members, they can be rigid against the rotational force to be transmitted and are hardly distorted thereby.

9 Claims, 6 Drawing Sheets

FLEXIBLE COUPLING WITH BENT PLATE BODY

This application is a continuation of application Ser. No. 006,181, filed Jan. 23, 1987, now abandoned.

TECHNICAL FIELD

This invention relates to a flexible coupling usable for transmitting a rotational force from a driving member to a driven member. More particularly, the invention relates to a flexible coupling which is capable of smoothly transmitting a rotational force from a driving shaft to a driven shaft with little loss in the transmission between the shafts and without causing backlash, even when the axes of the driving shaft and the driven shaft are not accurately aligned.

BACKGROUND OF THE INVENTION

Conventional shaft couplings used for the purpose as described above include a flexible coupling utilizing resiliency of a rubber material or coil springs. A slide coupling such as an Oldham's coupling has also been used heretofore.

However, the coupling using the resilient members such as rubber members are liable to be distorted in the rotational direction due to a load torque and they are not suitable for uses which require highly accurate transmission of a rotational angle. The coupling using coil springs has such a disadvantage that the allowable range of an axial offset is narrow and the fluctuation of the rotational force due to an increase of a bearing load is large. On the other hand, the slider coupling is disadvantageous especially in intermittent rotational driving since an impact load is directly transmitted therethrough, causing or promoting undesirable backlash.

SUMMARY OF THE INVENTION

It is therefore an object of the present invention to provide an improved flexible coupling.

It is another object of the present invention to provide a flexible coupling useful in practical applications and simple in structure, which has a flexibility large enough to allow dis-alignment between axes of shafts to be coupled, but is little subjected to flexure in a torsional direction and causes no substantial backlash.

It is a further object of the present invention to provide an improved flexible coupling, which is capable of absorbing and reducing momentary impact stress caused when an intermittent driving force is applied, to eliminate the backlash and prolong the life of the coupling.

According to the present invention, in a flexible coupling for transmitting a rotational output from a drive member to a driven member, the flexible coupling comprises a supporting member, a first pair of flexible plate members which extend in parallel in one direction at equal spaces, each one end portion of the flexible plate members of the first pair being fixed to the supporting member, a second pair of flexible plate members which extend in parallel in a direction opposite to the one direction at equal spaces, each one end portion of the flexible plate members of the second pair being fixed to the supporting member, a first joint member for connecting the drive member to the flexible coupling, the first joint member being connected to each of two end portions of the flexible plate members of the first pair, and a second joint member for connecting the driven member to the flexible coupling, the second joint member being connected to each of two end portions of the flexible plate members of the second pair.

With this arrangement, when there is a disalignment between the axes of the drive member and the driven member, a bending force is applied to the first pair of flexible plate members and/or the second pair of the flexible plate members to flex the same, thus absorbing the axial offset between the rotary members. These flexible plate members are flexed to absorb the axial offset when the rotary members are offset in parallel and also flexed to absorb the axial offset when the rotary members are offset not in parallel. In this connection, it is to be noted that since the rotational force to be transmitted is applied in the width direction of the respective flexible plate members, the respective flexible plate members can be rigid against the rotational force to be transmitted and are hardly distorted thereby. Thus, an error in the rotational angle between the input and the output of the flexible coupling can be remarkably small.

In the case where the rotational force to be input to the flexible coupling is an intermittent rotational output, for example, from a stepping motor, a resilient member or members may be interposed between the respective plate members and the first and the second joint member, at the connecting portions thereof, so as to reduce an impact stress caused in the flexible coupling by such an intermittent rotational output. With this arrangement, the rotational impact force caused in the flexible coupling is resiliently absorbed by the resilient member or members within a relatively small rotational angular range, but the arrangement has a high torsional rigidity against the stationary rotational force. Thus, when an intermittent rotational force is applied to the flexible coupling, a momentary impact stress is absorbed and softened by slight deformation of the resilient member or members. Thus, excess torsion is never caused in the flexible coupling.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
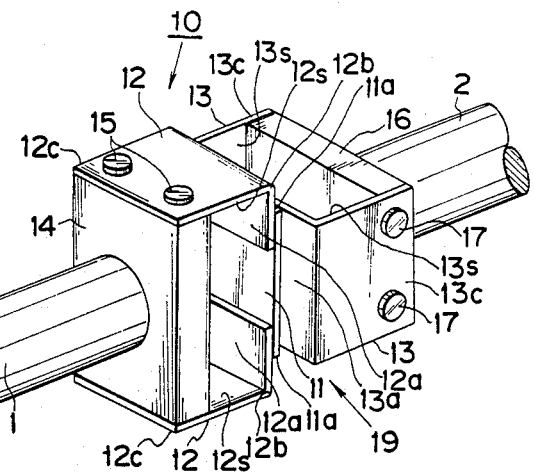
FIG. 1 is a perspective view of an embodiment of a flexible coupling according to the present invention.

In FIG. 1, numeral 10 generally designates an embodiment of a flexible coupling according to the present invention. The flexible coupling 10 is a coupling for transmitting a rotational output from a driving shaft 1 to a driven shaft 2, and the driving shaft 1 is coupled to the driven shaft 2 through the flexible coupling 10.

The flexible coupling 10 comprises a body 19 including a supporting plate 11 made of an iron plate or stainless steel plate having a rigidity. Fixed to the supporting plate 11 are a pair of flexible plate members 12, 12 and another pair of flexible plate members 13, 13, which also form the body 19. The flexible plate members 12, 12 are each formed of a relatively thin stainless steel plate (for example, a spring stainless steel plate having a thickness of 0.15 mm or so). In the embodiment as illustrated, the flexible plate members 12, 12 are each bent at a right angle so as to form an L-shape in section. The bent end portions 12a, 12a of the respective plate members 12, 12 are welded to the supporting plate 11 so that the flexible plate parts 12s, 12s may extend in parallel with each other, keeping a predetermined space therebetween. Of course, the flexible plate members 12, 12 may alternatively be fixed to the supporting plate 11 by other known means such as bolting. As can be seen from FIG. 1, the flexible plate members 12, 12 are fixed in such a way that their respective bending edges 12b of the bent end portions 12a are spaced from an end 11a of the supporting plate 11 by a certain length.

A first joint member 14 for connecting the driving shaft 1 to the flexible coupling 10 is fixed to the pair of flexible plate members 12, 12 by bolts 15, at free ends 12c of the respective flexible plate members 12, 12. The first joint member 14 and the driving shaft 1 may be connected by any known means, such as bolting or welding.

On the other hand, the other pair of flexible plate members 13, 13 are also made of relatively thin stainless steel plates bent in an L-shape in section and fixed, by some suitable means, to the supporting plate 11 so as to extend in parallel with each other, keeping a space therebetween, in a way substantially the same as the flexible plate members 12, 12. However, the mounting direction of the flexible plate members 13, 13 is such that one plane parallel with main surfaces of the respective flexible plate parts 13s, 13s is orthogonal to the plane parallel with main surfaces of the respective flexible plate parts 12s, 12s. However, as will be understood from the description forementioned, the relationship therebetween is not limited to the condition that one plane is orthogonal to another plane.

The flexible plate members 13, 13 are fixed by keeping means, such as bolts 17, at their respective free ends 13c, 13c, by bolts 17, 17 to a second joint member 16 for fixing the flexible couplings 10 to the driven shaft 2. The second joint member 16 and the driven shaft 2 are fixed by any suitable known means such as bolting.

When a rotational output from the driving shaft 1 is applied to the flexible coupling 10, the rotational output is transmitted to the driven shaft 2 through the first joint member 14, the pair of flexible plate members 12, 12, the supporting plate 11, the further flexible plate members 13, 13 and the second joint member 16. In this case, the rotational output to be transmitted is all applied in a width direction of the section of the respective members. Therefore, if the width of the section of the respective member is assumed as W and the thickness thereof is assumed as t, the geometrical moment of inertia $I_1$ will be:

$$I_1 = 1/12 \cdot W^3 t \tag{1}$$

In this case, the width W is much larger than the thickness t, the value of the geometrical moment of inertia $I_1$ is large and a flexure in the rotation direction or an error in a rotation angle, which is in inverse proportion to the geometrical moment of inertia, is extremely small.

Figure 2:
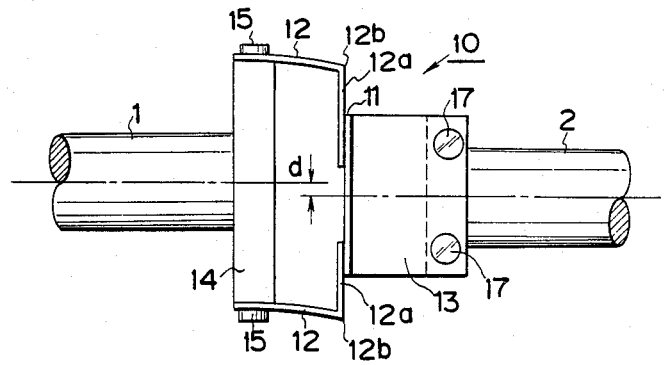
FIGS. 2 and 3 are front views of the flexible coupling shown in FIG. 1, which illustrate operating conditions of the flexible couplings.

When the axes of the driving shaft 1 and the driven shaft 2 are offset in parallel by a distance d as shown in FIG. 2, a bending force is exerted alternately onto the flexible plate members 12, 12 and the flexible plate members 13, 13. This enables the rotational output from the driving shaft 1 to be transmitted to the driven shaft 2 without a loss, irrespective of the offset of the axes.

Figure 3:
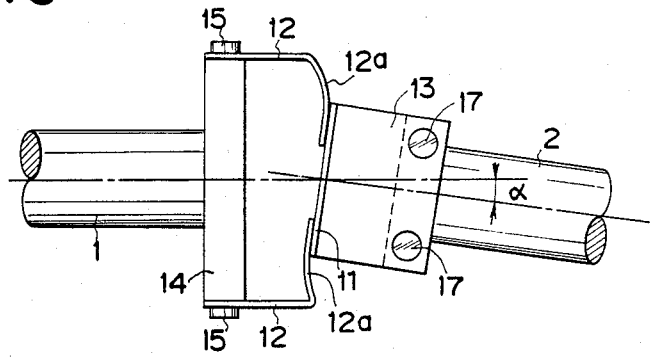

On the other hand, when the driving shaft 1 and the driven shaft 2 are deviated from each other by an angle α as shown in FIG. 3, the flexible plate members 12, 12 or the flexible plate members 13, 13 are flexed alternately, to absorb the offset, at their respective portions of the bent end portions 12a or 13a where they are not fixed to the supporting plate 11 as shown in FIG. 3.

In the case of FIGS. 2 and 3, the force is applied in the thickness direction of the respective member and therefore, the geometrical moment of inertia $I_2$ will be:

$$I_2 = 1/12 \cdot t^3 W \tag{2}$$

Now, if it is assumed that the width W is 10 mm and the thickness t is 0.15 mm, the geometrical moment of inertia $I_1$ in the transmission of the rotational output as described above will be:

$$I_1 = 1/12 \cdot 10^3 \times 0.15 = 12.5 \ mm^4$$

On the other hand, for a flexure due to the offset of the axes or bending, the geometrical moment of inertia $I_2$ will be obtained according to the formula (2) as follows:

$$I_2 = 1/12 \cdot 0.15^3 \times 10 = 0.0028 \ mm^4$$

In this example, the ratio of $I_1$ to $I_2$ is more than 4000. This shows a high rigidity against flexure when the rotational force is applied and ease in flexing when there is an axial offset or bending. The excellency of these characteristics is far beyond a level of the state of the art.

Although the four flexible plate members 12, 12, 13, 13 are fixed to the supporting plate 11 to form the body 19 in the embodiment of the present invention as illustrated in FIG. 1, some or all of the flexible plate members may be formed integrally with the supporting plate 11. This formation is illustrated in FIG. 4.

Figure 4:
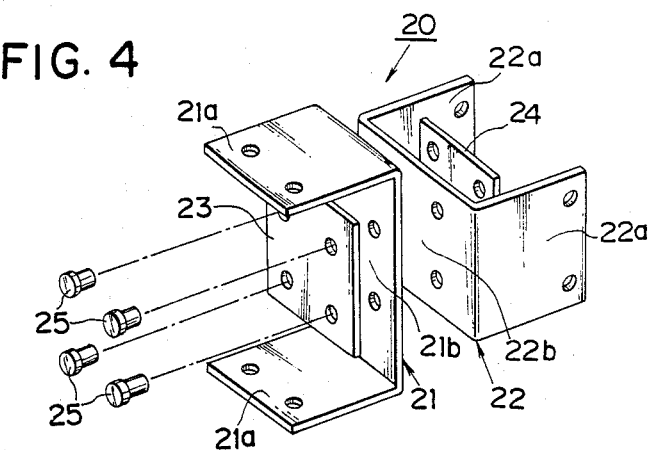
FIG. 4 is an exploded view showing another embodiment of a body shown in FIG. 1.

A flexible coupling 20 as illustrated in FIG. 4 comprises two plate members 21, 22 each of which is formed of a stainless steel plate (for example, 0.15 mm in thickness) having flexibility which is bent in a channel shape in section. These two plate members 21, 22 are assembled back to back so as to face in opposite directions and fixed by rivets 25 using backplates 23, 24. Flexible plate portions 21a, 21a of the plate member 21 and flexible plate portions 22a, 22a of the plate member 22 correspond to the flexible plate members 12 and the flexible plate members 13, respectively. The fixing portions 21b, 22b of the plate members 21, 22 correspond to the supporting plate 11. In this connection, it is to be noted that members corresponding to the joint members 14, 16 of FIG. 1, respectively, are omitted in FIG. 4.

This arrangement is advantageous in that the plate members 21, 22 may be disposed so that the rolling direction of the material may be oriented longitudinally; and the central portions of the respective plate members 21, 22 are reinforced by the backplates 23, 24, respectively so that the central portions may retain their planar configuration, ensuring the function of the coupling and increasing the working load torque capacity.

Figure 5:
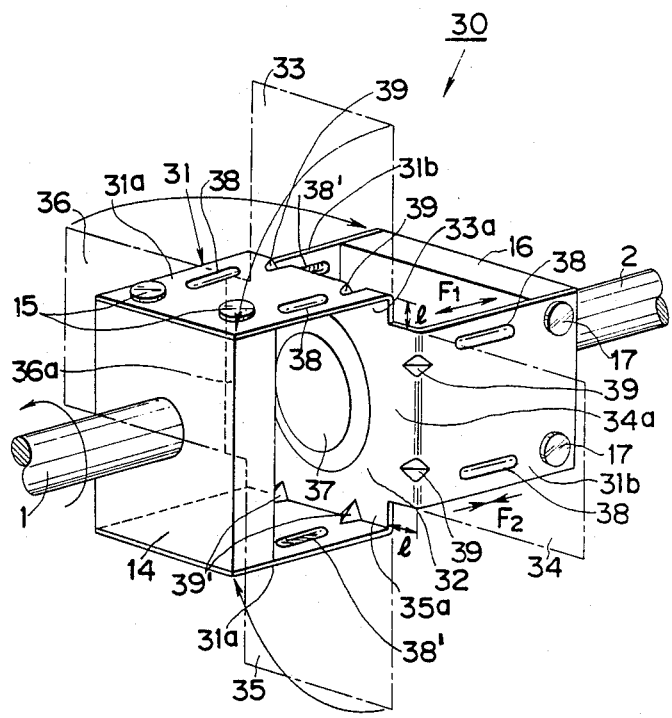
FIG. 5 is a perspective view of another embodiment of a flexible coupling according to the present invention.

FIG. 5 illustrates still another form of a flexible coupling according to the present invention. The flexible coupling 30 as illustrated in FIG. 5 has a remarkable difference from the foregoing embodiments as illustrated in FIGS. 1 and 4 in that the members corresponding to the supporting plate 11 and the four flexible plate members 12, 12, and 13, 13 of FIG. 1 are integrally formed of an integral, single flexible plate. In FIG. 5, parts or portions the same as those of FIG. 1 are denoted by the same numerals and the explanation thereof is omitted.

A member designated by 31 is a body which is formed by bending a cross-shaped plate member (denoted by a dot-dash-line in FIG. 5). The cross-shaped plate member comprises a central portion 32 corresponding to the supporting plate 11 and extensions 33 to 36 which extend integrally from the central portion 32. These four extensions 33 to 36 are bent as illustrated in FIG. 5 to form a pair of flexible plate portions 31a, 31a and another pair of flexible plate portions 31b, 31 b.

The extensions 33 to 36 are each bent at a right angle in respectively predetermined directions at respective positions remote by a length l from their respective base ends integral with the central portions. Thus, projected planar portions 33a, 34a, 35a and 36a are formed at the respective base ends of the extensions 33 to 36. In this connection, it is to be noted that a plane parallel with the flexible plate portions 31a and a plane parallel with the flexible plate portions 31b are orthogonal with each other as in the foregoing embodiments.

The material of the cross-shaped plate member may, for example, be spring stainless steel having a thickness of 0.15 mm or so. In this case, necessary flexibility is imparted to the body 31. To provide more rigidity to a necessary portion of the body 31 without losing the necessary flexibility, there is formed by extrusion drawing a circular protuberance 37 on the central portion 32 and elliptic protuberances 38 which act like a rib and extend along the axis of the flexible coupling are formed on each of the flexible plate portions 31a, 31a and 31b, 31b in the vicinity of the side edges thereof. As shown in FIG. 5, the protuberance 37 projects axially towards driving shaft 1 and protuberances 38 project radially outward so that corresponding grooves 388' are formed on the inward side of the flexible plate portions. However, the projected directions of the protuberances 37, 38 may be selected arbitrarily and are not limited to those of the embodiment as illustrated.

With the protuberance 37, the central portion 32 can be prevented from being slacked even when the central portion 32 is subjected to a rotational force. Thus, a cause for an error in a transmission angle may be eliminated. The elliptic protuberances 38 can improve the rigidity of the flexible plate portions against a tension $F_1$ acting on one edge of the respective flexible plate portions in the axial direction and a compression force $F_2$ acting on another edge of the respective flexible plate portions in the axial direction, when a transmitting force is applied to the respective flexible plate portions. Therefore, possible buckling of the flexible plate portions due to the compression force $F_2$ can be effectively prevented and an error in the transmission angle can be minimized.

The bent portions or bending edges resulting from the forming of the flexible plate portions have recesses which are made by pressing the bending edges in such a way that the front side forms a groove 39 and the back side forms a protuberance 39'. These grooves 39 function to prevent the lowering of the rigidities of the bent portions or improve the rigidities, even after the outer surface portions of the plate portions are stretched by the bending process and the thicknesses are reduced at the bent portions. As a result of this, torsional stresses caused at various portions by the rotational force are evened and the life of the flexible coupling can be extended remarkably.

In the flexible coupling 30 as illustrated in FIG. 5, the operation of absorbing an axial or offset between the driving shaft 1 and the driven shaft 2 is substantially the same as those as described above referring to FIGS. 2 and 3.

Figure 6:
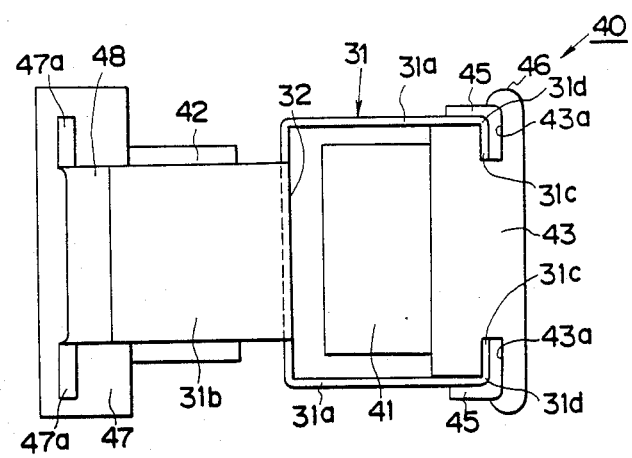
FIG. 6 is a front view of a further embodiment of a flexible coupling according to the present invention.
Figure 7:
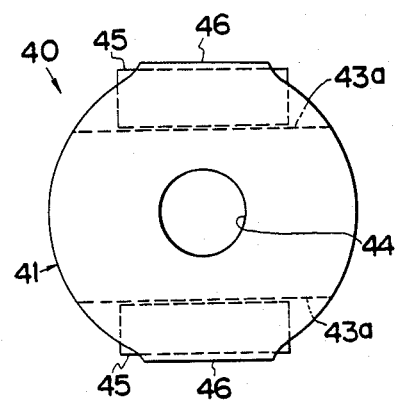
FIG. 7 is a right side view of the flexible coupling shown in FIG. 6.

FIGS. 6 and 7 illustrate a still further form of flexible coupling according to the present invention. The basic arrangement of a flexible coupling 40 is substantially the same as that of the flexible coupling 30 illustrated in FIG. 5, but the flexible coupling 40 differs from the foregoing flexible couplings in that the durability of the connecting portions between the joint members and the flexible plate portions are further improved.

The flexible coupling 40 as illustrated in FIG. is substantially the same as the flexible coupling 30 as illustrated in FIG. 5 except for joint members 41, 42 and a connecting arrangement of the respective joint members to the flexible plate portions. Therefore, in FIG. 6, the corresponding parts or portions are denoted by the same numerals and the description thereof is omitted. Although the flexible coupling 40, illustrated in FIG. 6, is not provided with protuberances 37, 38 and grooves 39, for the sake of simplification of the explanation, such protuberances and/or grooves may be formed on the body 31 of the flexible coupling 40.

Figure 8:
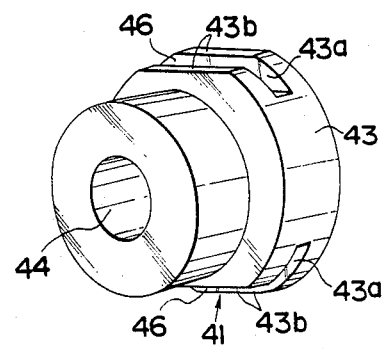
FIG. 8 is a perspective view of a first joint member of FIG. 6.

Tip ends 31c, 31c of the respective flexible plate portions 31a, 31a are bent inwardly at a right angle and fitted into a pair of grooves 43a, 43a, respectively, which are formed on flanges 43 of a joint member 41 as will be described in detail later. As illustrated in FIG. 8, the joint member 41 is a substantially cylindrical member provided with a shaft hole 44 for receiving and fixing a driving shaft (not shown) and may be made, for example, of aluminum. The width of the groove 43a is larger than the thickness of the flexible plate portion 31a. The tip ends 31c, 31c of the flexible plate portions 31a, 31a are press-fitted into the grooves 43a, 43a, respectively, together with press members 45, 45 made of a resilient plate material, such as leaf spring, and having an L-shape in section. Thus, the respective tip ends 31c are positioned in the corresponding grooves 43a. The flange 43 has, on its periphery, flat portions 43b corresponding to the grooves 43a, so that the flexible plate portions 31a fitted in the respective grooves 43a can be stably assembled with the joint member. The materials of the press member 45 may be selected from materials having flexibility and yet having more rigidity than that of the body 31. For example, if the body 31 is made of a spring stainless steel plate of 0.15 mm thickness, the press member 45 may be made of a spring stainless steel plate of about 0.4 mm thickness.

To make the assembling more sure, a staking portion 46 of the joint member 41 is staked or caulked along the bent portion of the press member 45 to provide keeping means. Thus, the joint member 41 is fixed to the tipend portions of the pair of flexible plate portions. Another joint member 42 is fixed to the body 31 in such a manner that the tip end portions of the flexible plate portions 31b, 31b are fitted in grooves 47a formed on the flange 47 of the joint member 42 together with resilient press members 48, respectively. The details of the fixing is substantially the same as those for the joint member 41 and accordingly the explanation of the detail is not repeated here.

With the arrangement as described above, the bent portions 31d, which are formed at the tip end portions of the flexible plate portions, are pressed by the resilient press members 45 which is more rigid as compared with the flexible plate portions, respectively, so that a stress caused when the flexible plate portions 31a are flexed, can be dispersed all over the flexible plate portions without being locally concentrated to some specific portions. Thus, the life is remarkably extended. For example, in the flexible coupling 30 of FIG. 5, a stress caused by the deflection is concentrated to a portion around the throughholes (not shown) for the bolts 15, which may cause cracking at the portion due to metal weariness, shortening the life of the flexible coupling.

Figure 9:
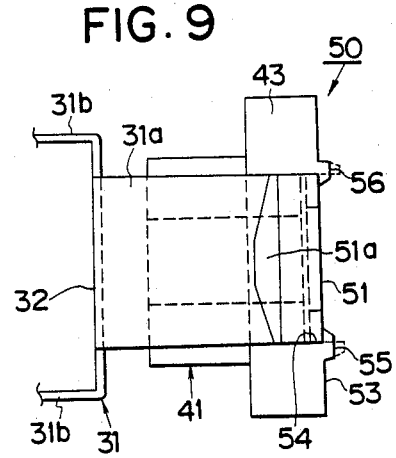
FIG. 9 is a plan view showing a modification of the flexible coupling shown in FIG. 6.
Figure 10:
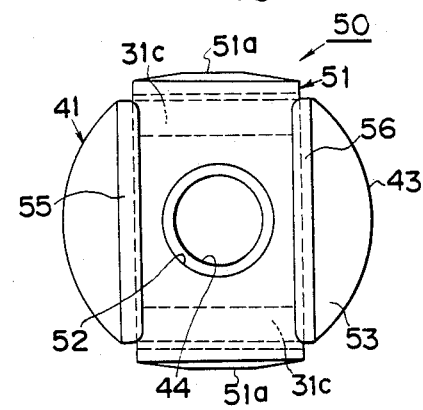
FIG. 10 is a right side view of the modified flexible coupling shown in FIG. 9.
Figure 11:
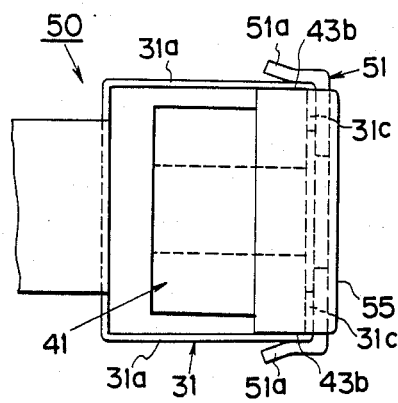
FIG. 11 is a front view of the flexible coupling shown in FIG. 9.

FIGS. 9, 10 and 11 illustrate a modified form of the flexible coupling 40. A flexible coupling 50 illustrated in FIGS. 9, 10 and 11 only differs from the flexible coupling 40 of FIG. 6 in that it employs a single press member 51 of a channel shape in section for securing the joint member 41 to the pair of flexible plate portions 31a, 31a, instead of the two L-shaped press members 45, 45. Therefore, in FIGS. 9, 10 and 11, same or similar parts or portions are denoted by same or similar numerals and the explanation of the common parts or portions is omitted here.

The press member 51 is made of a material similar to that of the press member 45. The press member 51 has a throughhole 52 having a diameter slightly larger than the shaft hole 44 and the member 51 is accommodated in a relatively wide groove 54 formed on an outer end face of the joint member 41. The hook-like tip ends 31c, 31c of the respective flexible plate portions 31a, 31a are fitted in the groove 54 from the opposite ends of the groove (See FIG. 11). Ribs 55, 56 are provided on the opposite sides of the groove 54 and the ribs 55, 56 are bent over the press member 51 to press the press member and provide a first keeping means. Thus, the press member 51 is fully fixed within the groove 54. A second joint member identical to joint member 41 is fixed to coupling body 31 in the same manner wherein the tip end portions of the flexible plate portions 31b, 31b are fixed in a corresponding groove of the second joint member by a pair of bent over ribs providing a second keeping means.

The press member 51 has opposite ends 51a, 51a which are bent inwardly to have resiliency for biasing or urging the flexible plate portions. Therefore, when the press member 51 is set in a position, the bent tip end portions of the respective flexible plate portions 31a, 31a are pressed against the flat portions 43b, 43b of the joint member 41. This arrangement can disperse a stress caused by flexure of the flexible plate portions when the flexible plate portions 31a are flexed, while preventing the stress from being locally concentrated to some specific portions (for example, the bent tip end portions), as in the embodiment of FIG. 6.

Figure 12:
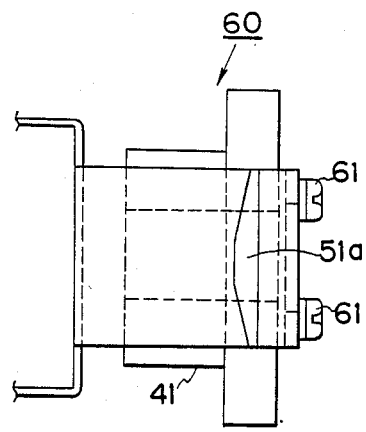
FIG. 12 is a plan view showing a modification of the flexible coupling shown in FIG. 9.
Figure 13:
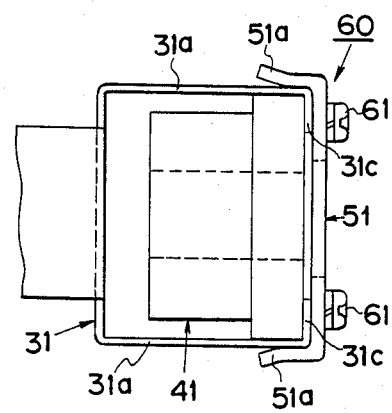
FIG. 13 is a front view of the flexible coupling shown in FIG. 12.
Figure 14:
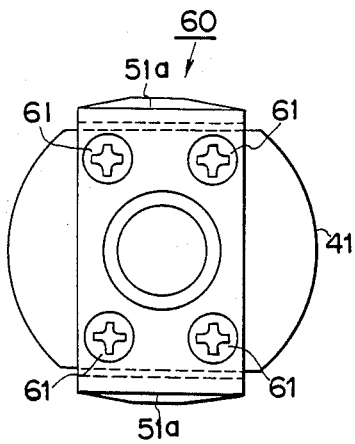
FIG. 14 is a right side view of the flexible coupling shown in FIG. 12.

FIGS. 12, 13 and 14 illustrate a modification of the flexible coupling 50 of FIGS. 9, 10 and 11. A flexible coupling 60 as illustrated in FIGS. 12, 13 and 14 has a difference from the flexible coupling 50 that the channel-shaped press member 51 is fixed to the joint member 41 by a plurality of screws 61.

Figure 15:
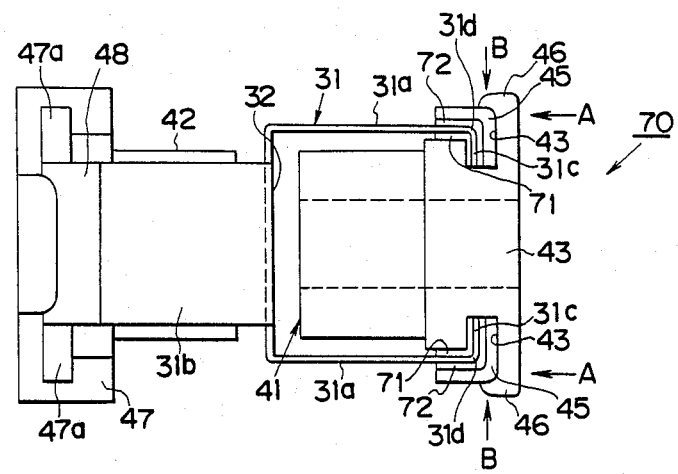
FIG. 15 is a front view showing a still further embodiment of a flexible coupling of the present invention.

FIG. 15 illustrates a still further improved form of the flexible coupling according to the present invention. A flexible coupling 70 shown in FIG. 15 includes an improvement over the flexible coupling 40 of FIG. 6 so as to absorb and soften a momentary impact stress caused, for example, when a rotational output is applied intermittently and to prevent an excess torsion from being caused. The structural feature of the flexible coupling 70 is that elastic members such as relatively thin rubber plates 71, 72 are provided on the opposite sides of the bent portions 31d of the respective flexible plate portions 31a, 31a. The remaining structure is substantially the same as that of the flexible coupling 40 shown in FIG. 6. Therefore, same or similar parts or portions are indicated by same or similar numerals in FIG. 15 and the explanation therefore is omitted.

With this arrangement, the bent portions 31d covered with the rubber plates 71, 72 on the opposite surfaces thereof are press fitted in the grooves 43a formed on the flanges 43 of the joint member 41 together with the press member 45 and caulked or staked at the staking portion 46 to fix the joint member 41 to the body 31. As a result of this, the joint member 41 is positively and fully fixed to the flexible plate portions 31a, 31a in either direction of arrows A and B. Another joint member 42 is fixed in the same manner.

Thus when the flexible coupling 70 is employed for a device which generates a rotational output intermittently, such as a stepping motor, a shock caused by the momentary impact stress which is applied at a time of starting of the rotation can be highly softened.

More particularly, if the stress is transmitted, as it is, without being treated, it causes vibration or noises on the shaft coupling or the arrangement on the driven side and accelerates the mechanical weariness thereof and it momentarily requires a large driving torque for the pulse motor, necessitating the motor to be of large size and requiring a large driving power. Moreover, it sometimes causes stepping out and produces various troubles. Therefore, the direct transmission of such a momentary impact stress should be avoided.

In the flexible coupling of the present invention, since the bent tip end portions of the flexible plate portions are covered with the thin rubber plates 71, 72 on the both sides thereof at the fixing portions of the joint members 41, 42, an abrupt torsional stress is absorbed and softened and the impact stress is not transmitted directly to the driven side.

Figure 16:
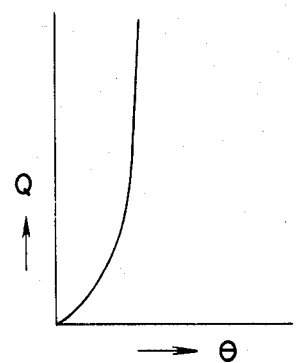
FIG. 16 is a graph showing a characteristics of the flexible coupling shown in FIG. 15.

FIG. 16 shows a torque transmission characteristic of the flexible coupling 70, with ordinate of a torque Q and abscissa of a torsional angle 8. The figure shows that flexible coupling 70 is liable to be distorted due to the actions of the rubber plates 71, 72 within a certain angular range, but it has a high torsional rigidity beyond such an angular range.

FIG. 17A to FIG. 17D shows various characteristics of the flexible coupling 70 of FIG. 15 when it is used to transmit a rotational output from a stepping motor to a driven rotary shaft. In FIGS. 17A to 17D, the abscissa indicates a time T.

Figure 17A:
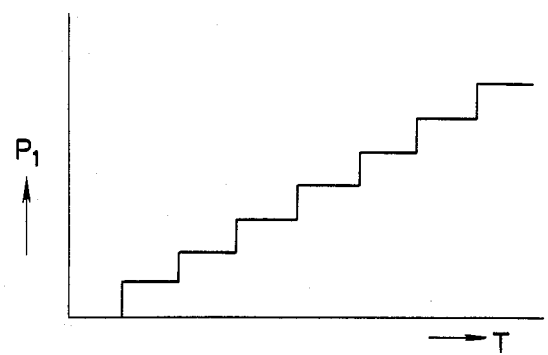
FIGS. 17A to 17D are graphs showing transmitting characteristics of the flexible coupling shown in FIG. 15.
Figure 17B:
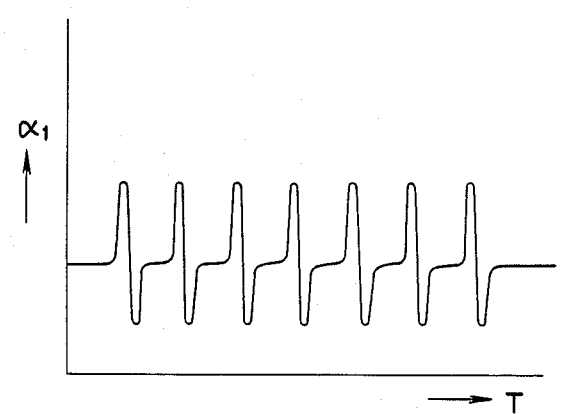
Figure 17C:
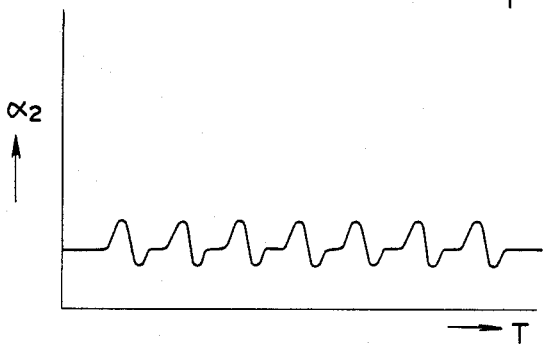
Figure 17D:
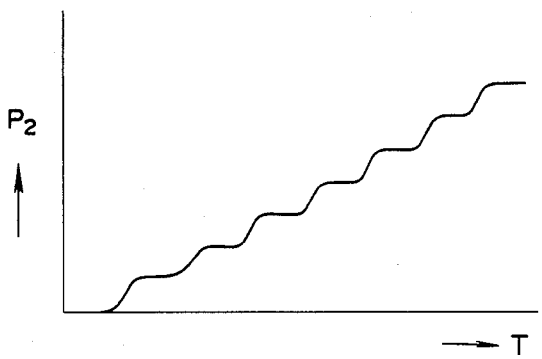

When an output shaft of the stepping motor (not shown) is intermittently rotated and an angular position $P_1$ of the output shaft is varied stepwise as shown in FIG. 17A, the resultant rotational acceleration $\alpha_1$ of the output shaft will be as shown in FIG. 17B. A force due to this rotational acceleration $\alpha_1$ is transmitted to the driven rotary shaft through the flexible coupling 70 of FIG. 15. At this time, however, a momentary impact stress due to the rotational acceleration $\alpha_1$ is absorbed and softened by the rubber plates 71, 72 used at the fixing portions between the joint members 41, 42 and the body 31. As a result of this, a rotational acceleration $\alpha_2$ caused on the driven rotary shaft becomes relatively small as can be seen from FIG. 17C. FIG. 17D shows the changes of an angular position $P_2$ of the driven rotary shaft.

As apparent from the above, the rubber plates 71, 72 bring a remarkable effect in the absorption and softening of the impact stress. Particularly, when a moment of inertia is large on the driven side, the characteristic becomes more smooth than the curve of FIG. 17D and the value of the acceleration of FIG. 17C is further reduced. The rotational torque is determined by a product of the moment of inertia and the acceleration. Therefore, when the flexible coupling having such characteristics is used, a rotating torque required to drive the driven parts of large inertia force by the stepping motor can be highly reduced.

Figure 18:
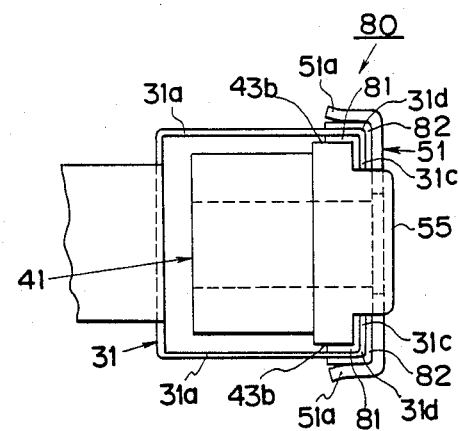
FIG. 18 is a front view showing a modified embodiment of the flexible coupling shown in FIG. 15.

FIG. 18 illustrates a modification of the embodiment as illustrated in FIGS. 9 to 11. A flexible coupling 80 illustrated in FIG. 18 is to improve the flexible coupling 50 so that it can absorb and soften the momentary impact stress caused, for example, when the rotational force is applied intermittently, and capable of preventing an excessive torsion. The structural feature of this embodiment lies in resilient members, such as rubber plates 81, 82 of a relatively small thickness which are fitted the opposite sides of the respective bent tip end portions of the pair of flexible plate portions. The remaining arrangement is similar to that of the flexible coupling 50 of FIGS. 9 to 11. Therefore, same or similar parts or portions are denoted by same or similar numerals in FIG. 18 and the explanations thereof are omitted here.

The effects of the rubber plates 81, 82 are substantially the same as that of the embodiment illustrated in FIG. 15.

With respect to a connecting arrangement between the body and the joint members, the arrangements as shown in FIG. 6, FIG. 9, FIG. 15 and FIG. 18 may, of course, be applicable to the flexible coupling of FIG. 1 or FIG. 5.

We claim:

1. A flexible coupling for transmitting a rotational output from a drive member to a driven member, said flexible coupling comprising:

a body formed by bending a single cross-shaped flexible metal plate member which has a central portion and four flexible plate portions which are integrally extended from the central portion in such a way that a first and second flexible plate portions opposite each other are bent so as to be directed in one direction in parallel at equal spaces and a third and fourth flexible plate portions opposite each other are bent so as to be directed in another direction opposite to the one direction in parallel at equal spaces, each of the flexible plate portions being bent along a bending edge so as to be substantially perpendicular to a surface of the central portion, each bending edge of the flexible plate portions being spaced apart from an edge of the central portion by a predetermined distance along the corresponding flexible plate portion, and each free end portion of the flexible plate portions being bent at substantially right angles so as to form hook-like portions;

a first joint member for connecting the drive member to said body, said first joint member having two edge portions for engaging the hook-like portions of the first and second flexible plate portions, respectively, each configuration of the edge portions of the first joint member corresponding to each configuration of the hook-like portions of the first and second flexible plate portions;

a first pressing means comprising a first U-shaped leaf spring for tightly pressing the hook-like portions of the first and second flexible plate portions to the corresponding edge portions of the first joint member, respectively;

a first keeping means for keeping the tightly pressing condition obtained by means of the first pressing means;

a second joint member for connecting the driven member to said body, said second joint member having two edge portions for engaging the hook-like portions of the third and fourth flexible plate portions, respectively, each configuration of the edge portions of the second joint member corresponding to each configuration of the hook-like portions of the third and fourth flexible plate portions;

a second pressing means comprising a second U-shaped leaf spring for tightly pressing the hook-like portions of the third and fourth flexible plate portions to the corresponding edge portions of the second joint member, respectively; and a second keeping means for keeping the tightly pressing condition obtained by means of the second pressing means, said tightly pressing conditions obtained by means of said first and second pressing means preventing a stress caused by flexure of said flexible plate portions from being locally concentrated to some specific portion of said flexible plate portions.

2. A flexible coupling as claimed in claim 1, wherein said first joint member comprises a groove for receiving the hook-like portions of the first and second flexible plate portions, and these hook-like portions are fixed in said groove by the first pressing means and the first keeping means, respectively.

3. A flexible coupling as claimed in claim 2, wherein the hook-like portions of the first and second flexible plate portions and the corresponding first pressing means are fixed in said groove by said first keeping means, and wherein said first keeping means comprises a bent part of said first joint member.

4. A flexible coupling as claimed in claim 1, wherein said second joint member comprises a groove for receiving the hook-like portions of the third and fourth flexible plate portions, and these hook-like portions are fixed in the corresponding groove by the second pressing means and the second keeping means, respectively.

5. A flexible coupling as claimed in claim 4, wherein the hook-like portions of the third and fourth flexible plate portions and the corresponding second pressing means are fixed in said groove by said second keeping means, and wherein said second keeping means comprises a bent part of said second joint member.

6. A flexible coupling as claimed in claim 1, wherein each leaf spring is fixed to the corresponding joint member by bending a part of the corresponding joint member over a portion of the leaf spring to form the corresponding keeping means.

7. A flexible coupling as claimed in claim 1 wherein at least one projected portion acting as a rib is formed by extruding a part of the main surface of the flexible plate portion, the projected portion having a configuration which increases the rigidity of the flexible plate portion in the width direction without impairing the flexibility of the flexible plate portion in the thickness direction.

8. A flexible coupling as claimed in claim 1 wherein a portion of each flexible plate portion adjacent to the hook-like portion is covered by an elastic member.

9. A flexible coupling as claimed in claim 8, wherein the elastic member is a rubber plate.

* * * * *